US008459035B2

(12) United States Patent
Smith et al.

(10) Patent No.: US 8,459,035 B2

(45) Date of Patent: Jun. 11, 2013

(54) GAS TURBINE ENGINE WITH LOW FAN PRESSURE RATIO

(75) Inventors: Peter G. Smith, Wallingford, CT (US); Stuart S. Ochs, Manchester, CT (US); Frederick M. Schwarz, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/340,761

(22) Filed: Dec. 30, 2011

(65) Prior Publication Data

US 2012/0222397 A1 Sep. 6, 2012

Related U.S. Application Data

(63) Continuation-in-part of application No. 11/829,213, filed on Jul. 27, 2007.

(51) Int. Cl.
*F02K 1/00* (2006.01)

(52) U.S. Cl.
USPC ................................................ 60/770; 60/771

(58) Field of Classification Search
USPC ............... 60/770, 771, 792, 802, 39.163, 788
See application file for complete search history.

(56) References Cited

U.S. PATENT DOCUMENTS

| | | | | |
|---|---|---|---|---|
| 3,948,346 | A | | 4/1976 | Schindler |
| 3,991,849 | A | | 11/1976 | Green et al. |
| 4,235,303 | A | | 11/1980 | Dhoore et al. |
| 4,292,802 | A | | 10/1981 | Snow |
| 4,461,145 | A | | 7/1984 | Stephens |
| 4,652,208 | A | | 3/1987 | Tameo |
| 4,710,097 | A | | 12/1987 | Tinti |
| 5,074,752 | A | | 12/1991 | Murphy et al. |
| 5,160,248 | A | | 11/1992 | Clarke |
| 5,169,288 | A | | 12/1992 | Gliebe et al. |
| 5,259,724 | A | | 11/1993 | Liston et al. |
| 5,315,821 | A | | 5/1994 | Dunbar et al. |
| 5,543,198 | A | | 8/1996 | Wilson |
| 5,655,360 | A | * | 8/1997 | Butler .......................... 60/226.2 |
| 5,706,651 | A | | 1/1998 | Lillibridge et al. |
| 5,768,884 | A | | 6/1998 | Hines |
| 5,778,659 | A | | 7/1998 | Duesler et al. |
| 5,791,138 | A | | 8/1998 | Lillibridge et al. |
| 5,832,714 | A | | 11/1998 | Hines |
| 5,867,980 | A | | 2/1999 | Bartos |

(Continued)

FOREIGN PATENT DOCUMENTS

| | | |
|---|---|---|
| EP | 0103260 | 3/1984 |
| EP | 0900920 | 3/1999 |

(Continued)

OTHER PUBLICATIONS

Extended European Search Report dated Nov. 3, 2011. EP App. No. 08252509.8-2321/2022949.

(Continued)

*Primary Examiner* — Phutthiwat Wongwian
*Assistant Examiner* — Vikansha Dwivedi
(74) *Attorney, Agent, or Firm* — Carlson, Gaskey & Olds

(57) ABSTRACT

A turbofan engine includes a fan variable area nozzle axially movable relative to the fan nacelle to vary a fan nozzle exit area and adjust a pressure ratio of the fan bypass airflow during engine operation.

22 Claims, 5 Drawing Sheets

U.S. PATENT DOCUMENTS

| | | | | |
|---|---|---|---|---|
| 5,943,856 | A | 8/1999 | Lillibridge et al. | |
| 6,371,725 | B1 | 4/2002 | Manteiga et al. | |
| 6,409,469 | B1 | 6/2002 | Tse | |
| 6,764,276 | B2 | 7/2004 | Mulcaire et al. | |
| 6,983,588 | B2 | 1/2006 | Lair | |
| 7,118,331 | B2 | 10/2006 | Shahpar | |
| 7,721,549 | B2 * | 5/2010 | Baran | 60/770 |
| 2004/0258520 | A1 | 12/2004 | Parry | |
| 2006/0179818 | A1 * | 8/2006 | Merchant | 60/226.1 |
| 2006/0228206 | A1 * | 10/2006 | Decker et al. | 415/1 |
| 2008/0155961 | A1 * | 7/2008 | Johnson | 60/226.3 |
| 2009/0097967 | A1 | 4/2009 | Smith et al. | |
| 2010/0043394 | A1 | 2/2010 | Pero | |
| 2010/0058735 | A1 | 3/2010 | Hurwitz et al. | |
| 2010/0068039 | A1 | 3/2010 | Winter | |

FOREIGN PATENT DOCUMENTS

| | | |
|---|---|---|
| GB | 1522558 | 8/1976 |
| GB | 2054058 | 2/1981 |
| JP | 2000345997 | 12/2000 |
| JP | 2003172206 | 6/2003 |
| WO | 2005056984 | 6/2005 |

OTHER PUBLICATIONS

Article—"Gears Put a New Spin on Turbofan Performance," printed from MachineDesign.com website.

Article—"Gas Power Cycle—Jet Propulsion Technology, a Case Study," from MachineDesign.com website.

International Search Report and Written Opinion dated Feb. 14, 2013.

* cited by examiner

GAS TURBINE ENGINE WITH LOW FAN PRESSURE RATIO

CROSS REFERENCE TO RELATED APPLICATIONS

The present disclosure is a continuation in part of U.S. patent application Ser. No. 11/829,213, filed Jul. 27, 2007.

BACKGROUND OF THE INVENTION

The present invention relates to a gas turbine engine, and more particularly to a turbofan engine having a variable geometry fan exit guide vane (FEGV) system to change a fan bypass flow path area thereof.

Conventional gas turbine engines generally include a fan section and a core section with the fan section having a larger diameter than that of the core section. The fan section and the core section are disposed about a longitudinal axis and are enclosed within an engine nacelle assembly. Combustion gases are discharged from the core section through a core exhaust nozzle while an annular fan bypass flow, disposed radially outward of the primary core exhaust path, is discharged along a fan bypass flow path and through an annular fan exhaust nozzle. A majority of thrust is produced by the bypass flow while the remainder is provided from the combustion gases.

The fan bypass flow path is a compromise suitable for take-off and landing conditions as well as for cruise conditions. A minimum area along the fan bypass flow path determines the maximum mass flow of air. During engine-out conditions, insufficient flow area along the bypass flow path may result in significant flow spillage and associated drag. The fan nacelle diameter is typically sized to minimize drag during these engine-out conditions which results in a fan nacelle diameter that is larger than necessary at normal cruise conditions with less than optimal drag during portions of an aircraft mission.

SUMMARY OF THE INVENTION

A gas turbine engine according to an exemplary aspect of the present disclosure includes a core nacelle defined about an engine centerline axis, a fan nacelle mounted at least partially around the core nacelle to define a fan bypass flow path for a fan bypass airflow, and a fan variable area nozzle axially movable relative the fan nacelle to vary a fan nozzle exit area and adjust a pressure ratio of the fan bypass airflow during engine operation, the fan pressure ratio less than about 1.45, the fan bypass airflow defines a bypass ratio greater than about six (6).

In a further non-limiting embodiment of any of the foregoing gas turbine engine embodiments, the engine may further include a multiple of fan exit guide vanes in communication with the fan bypass flow path, the multiple of fan exit guide vane rotatable about an axis of rotation to vary the fan bypass flow path.

In a further non-limiting embodiment of any of the foregoing gas turbine engine embodiments, the multiple of fan exit guide vanes may be simultaneously rotatable. Additionally or alternatively, the multiple of fan exit guide vanes may be mounted within an intermediate engine case structure. Additionally or alternatively, each of the multiple of fan exit guide vanes may include a pivotable portion rotatable about the axis of rotation relative a fixed portion.

In a further non-limiting embodiment of any of the foregoing gas turbine engine embodiments, the pivotable portion may include a leading edge flap.

In a further non-limiting embodiment of any of the foregoing gas turbine engine embodiments, the engine may further include a controller operable to control a fan variable area nozzle to vary a fan nozzle exit area and adjust the pressure ratio of the fan bypass airflow.

In a further non-limiting embodiment of any of the foregoing gas turbine engine embodiments, the controller may be operable to reduce the fan nozzle exit area at a cruise flight condition. Additionally or alternatively, the controller may be operable to control the fan nozzle exit area to reduce a fan instability.

In a further non-limiting embodiment of any of the foregoing gas turbine engine embodiments, the engine may further include a gear system driven by a core engine within the core nacelle to drive a fan within the fan nacelle, the fan defines a corrected fan tip speed less than about 1150 ft/second.

In a further non-limiting embodiment of any of the foregoing gas turbine engine embodiments, the engine may further include a gear system driven by a core engine within the core nacelle to drive a fan within the fan nacelle, the gear system defines a gear reduction ratio of greater than or equal to about 2.3.

In a further non-limiting embodiment of any of the foregoing gas turbine engine embodiments, the engine may further include a gear system driven by a core engine within the core nacelle to drive a fan within the fan nacelle, the gear system defines a gear reduction ratio of greater than or equal to about 2.5.

In a further non-limiting embodiment of any of the foregoing gas turbine engine embodiments, the engine may further include a gear system driven by the core engine to drive the fan, the gear system defines a gear reduction ratio of greater than or equal to 2.5.

In a further non-limiting embodiment of any of the foregoing gas turbine engine embodiments, the core engine may include a low pressure turbine which defines a low pressure turbine pressure ratio that is greater than about five (5). Additionally or alternatively, the core engine may include a low pressure turbine which defines a low pressure turbine pressure ratio that is greater than five (5).

In a further non-limiting embodiment of any of the foregoing gas turbine engine embodiments, the fan bypass airflow may define a fan pressure ratio less than about 1.45.

In a further non-limiting embodiment of any of the foregoing gas turbine engine embodiments, the engine bypass flow may define a bypass ratio greater than about ten (10). Additionally or alternatively, the bypass flow may define a bypass ratio greater than ten (10).

In a further non-limiting embodiment of any of the foregoing gas turbine engine embodiments, the engine may further include a multiple of fan exit guide vanes in communication with the fan bypass flow path, the multiple of fan exit guide vanes rotatable about an axis of rotation to vary said fan bypass flow path.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 4A is a sectional view of another embodiment of a single FEGV slatted airfoil with a;

DETAILED DESCRIPTION OF THE DISCLOSED EMBODIMENT

Figure 1A:
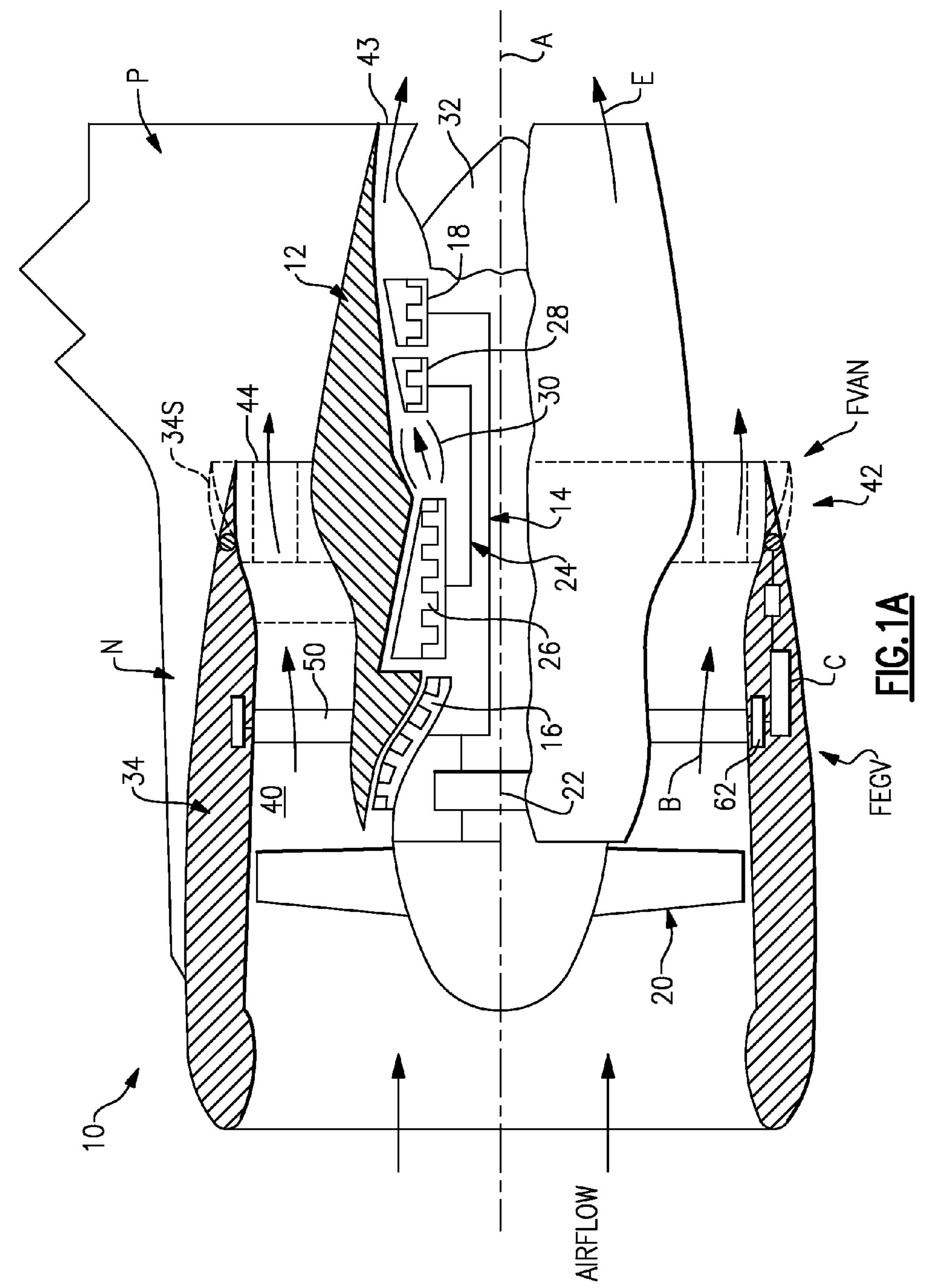
FIG. 1A is a general schematic partial fragmentary view of an exemplary gas turbine engine embodiment for use with the present invention.

FIG. 1 illustrates a general partial fragmentary schematic view of a gas turbofan engine 10 suspended from an engine pylon P within an engine nacelle assembly N as is typical of an aircraft designed for subsonic operation.

The turbofan engine 10 includes a core section within a core nacelle 12 that houses a low spool 14 and high spool 24. The low spool 14 includes a low pressure compressor 16 and low pressure turbine 18. The low spool 14 drives a fan section 20 directly or through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 is a high-bypass geared architecture aircraft engine. In one disclosed, non-limiting embodiment, the engine 10 bypass ratio is greater than about six (6), with an example embodiment being greater than about ten (10), the gear train 22 is an epicyclic gear train such as a planetary gear system or other gear system with a gear reduction ratio of greater than about 2.3 and the low pressure turbine 18 has a pressure ratio that is greater than about five (5). The engine 10 in the disclosed embodiment is a high-bypass geared turbofan aircraft engine in which the engine 10 bypass ratio is greater than ten (10), the turbofan diameter is significantly larger than that of the low pressure compressor 16, and the low pressure turbine 18 has a pressure ratio greater than five (5). Low pressure turbine 18 pressure ratio is pressure measured prior to inlet of low pressure turbine 18 as related to the pressure at the outlet of the low pressure turbine 18 prior to exhaust nozzle. The gear train 22 may be an epicycle gear train such as a planetary gear system or other gear system with a gear reduction ratio of greater than about 2.5. It should be understood, however, that the above parameters are exemplary of only one geared turbofan engine and that the present invention is likewise applicable to other gas turbine engines including direct drive turbofans.

Airflow enters a fan nacelle 34, which may at least partially surround the core nacelle 12. The fan section 20 communicates airflow into the core nacelle 12 for compression by the low pressure compressor 16 and the high pressure compressor 26. Core airflow compressed by the low pressure compressor 16 and the high pressure compressor 26 is mixed with the fuel in the combustor 30 then expanded over the high pressure turbine 28 and low pressure turbine 18. The turbines 28, 18 are coupled for rotation with respective spools 24, 14 to rotationally drive the compressors 26, 16 and, through the gear train 22, the fan section 20 in response to the expansion. A core engine exhaust E exits the core nacelle 12 through a core nozzle 43 defined between the core nacelle 12 and a tail cone 32.

A bypass flow path 40 is defined between the core nacelle 12 and the fan nacelle 34. The engine 10 generates a high bypass flow arrangement with a bypass ratio in which approximately 80 percent of the airflow entering the fan nacelle 34 becomes bypass flow B. The bypass flow B communicates through the generally annular bypass flow path 40 and may be discharged from the engine 10 through a fan variable area nozzle (FVAN) 42 which defines a variable fan nozzle exit area 44 between the fan nacelle 34 and the core nacelle 12 at an aft segment 34S of the fan nacelle 34 downstream of the fan section 20.

Figure 1B:
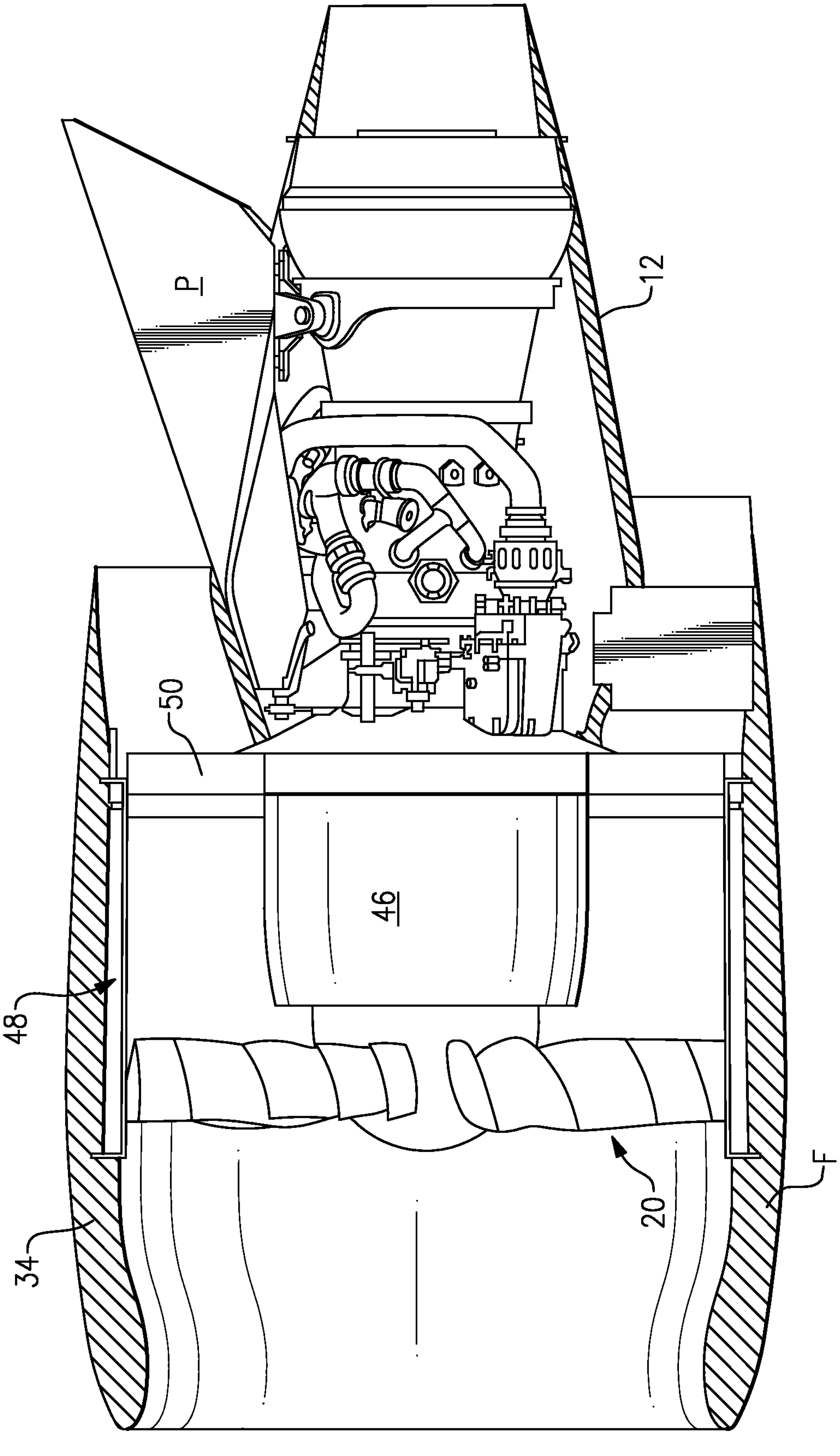
FIG. 1B is a perspective side partial fragmentary view of a FEGV system which provides a fan variable area nozzle.

Referring to FIG. 1B, the core nacelle 12 is generally supported upon a core engine case structure 46. A fan case structure 48 is defined about the core engine case structure 46 to support the fan nacelle 34. The core engine case structure 46 is secured to the fan case 48 through a multiple of circumferentially spaced radially extending fan exit guide vanes (FEGV) 50. The fan case structure 48, the core engine case structure 46, and the multiple of circumferentially spaced radially extending fan exit guide vanes 50 which extend therebetween is typically a complete unit often referred to as an intermediate case. It should be understood that the fan exit guide vanes 50 may be of various forms. The intermediate case structure in the disclosed embodiment includes a variable geometry fan exit guide vane (FEGV) system 36.

Thrust is a function of density, velocity, and area. One or more of these parameters can be manipulated to vary the amount and direction of thrust provided by the bypass flow B. A significant amount of thrust is provided by the bypass flow B due to the high bypass ratio. The fan section 20 of the engine 10 is nominally designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without the fan exit guide vane (FEGV) system 36. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

As the fan section 20 is efficiently designed at a particular fixed stagger angle for an efficient cruise condition, the FEGV system 36 and/or the FVAN 42 is operated to adjust fan bypass air flow such that the angle of attack or incidence of the fan blades is maintained close to the design incidence for efficient engine operation at other flight conditions, such as landing and takeoff. The FEGV system 36 and/or the FVAN 42 may be adjusted to selectively adjust the pressure ratio of the bypass flow B in response to a controller C. For example, increased mass flow during windmill or engine-out, and spoiling thrust at landing. Furthermore, the FEGV system 36 will facilitate and in some instances replace the FVAN 42, such as, for example, variable flow area is utilized to manage and optimize the fan operating lines which provides operability margin and allows the fan to be operated near peak efficiency which enables a low fan pressure-ratio and low fan tip speed design; and the variable area reduces noise by improving fan blade aerodynamics by varying blade incidence. The FEGV system 36 thereby provides optimized engine operation over a range of flight conditions with respect to performance and other operational parameters such as noise levels.

Figure 2A:
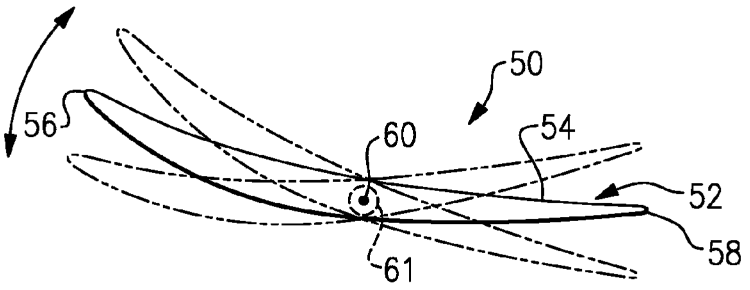
FIG. 2A is a sectional view of a single FEGV airfoil.

Referring to FIG. 2A, each fan exit guide vane 50 includes a respective airfoil portion 52 defined by an outer airfoil wall surface 54 between the leading edge 56 and a trailing edge 58. The outer airfoil wall 54 typically has a generally concave shaped portion forming a pressure side and a generally convex shaped portion forming a suction side. It should be understood that respective airfoil portion 52 defined by the outer airfoil wall surface 54 may be generally equivalent or separately tailored to optimize flow characteristics.

Figure 2B:
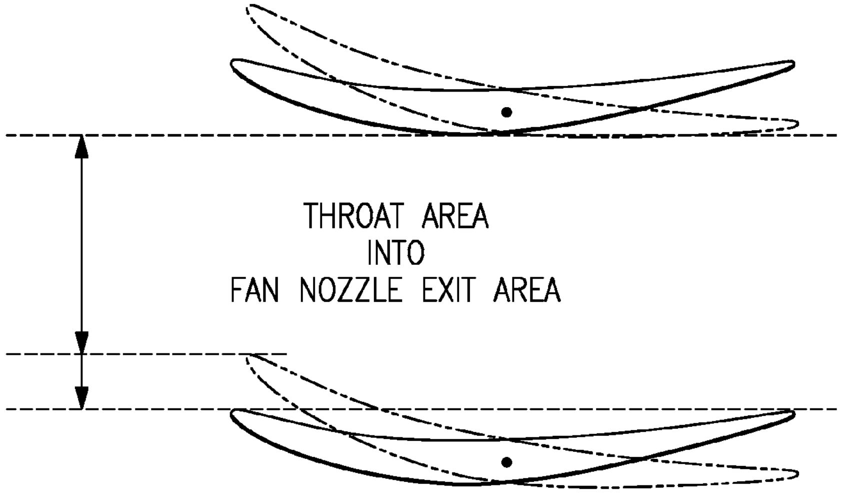
FIG. 2B is a sectional view of the FEGV illustrated in FIG. 2A shown in a first position.

Each fan exit guide vane 50 is mounted about a vane longitudinal axis of rotation 60. The vane axis of rotation 60 is typically transverse to the engine axis A, or at an angle to engine axis A. It should be understood that various support struts 61 or other such members may be located through the airfoil portion 52 to provide fixed support structure between the core engine case structure 46 and the fan case structure 48. The axis of rotation 60 may be located about the geometric center of gravity (CG) of the airfoil cross section. An actuator system 62 (illustrated schematically; FIG. 1A), for example only, a unison ring operates to rotate each fan exit guide vane 50 to selectively vary the fan nozzle throat area (FIG. 2B). The unison ring may be located, for example, in the intermediate case structure such as within either or both of the core engine case structure 46 or the fan case 48 (FIG. 1A).

Figure 2C:
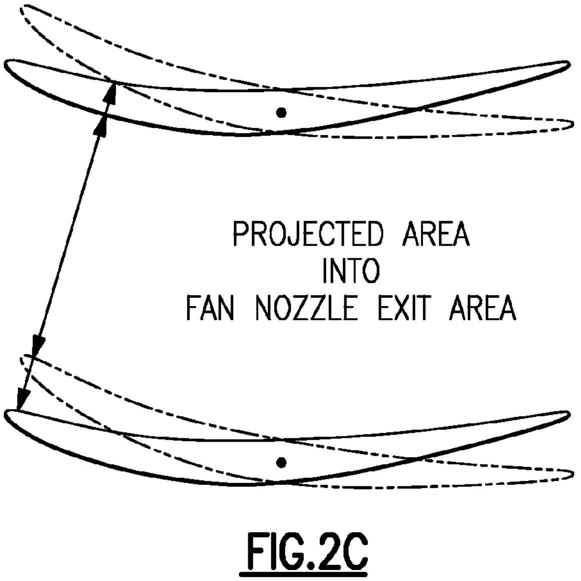
FIG. 2C is a sectional view of the FEGV illustrated in FIG. 2A shown in a rotated position.

In operation, the FEGV system 36 communicates with the controller C to rotate the fan exit guide vanes 50 and effectively vary the fan nozzle exit area 44. Other control systems including an engine controller or an aircraft flight control system may also be usable with the present invention. Rotation of the fan exit guide vanes 50 between a nominal position and a rotated position selectively changes the fan bypass flow path 40. That is, both the throat area (FIG. 2B) and the projected area (FIG. 2C) are varied through adjustment of the fan exit guide vanes 50. By adjusting the fan exit guide vanes 50 (FIG. 2C), bypass flow B is increased for particular flight conditions such as during an engine-out condition. Since less bypass flow will spill around the outside of the fan nacelle 34, the maximum diameter of the fan nacelle required to avoid flow separation may be decreased. This will thereby decrease fan nacelle drag during normal cruise conditions and reduce weight of the nacelle assembly. Conversely, by closing the FEGV system 36 to decrease flow area relative to a given bypass flow, engine thrust is significantly spoiled to thereby minimize or eliminate thrust reverser requirements and further decrease weight and packaging requirements. It should be understood that other arrangements as well as essentially infinite intermediate positions are likewise usable with the present invention.

By adjusting the FEGV system 36 in which all the fan exit guide vanes 50 are moved simultaneously, engine thrust and fuel economy are maximized during each flight regime. By separately adjusting only particular fan exit guide vanes 50 to provide an asymmetrical fan bypass flow path 40, engine bypass flow may be selectively vectored to provide, for example only, trim balance, thrust controlled maneuvering, enhanced ground operations and short field performance.

Figure 3A:
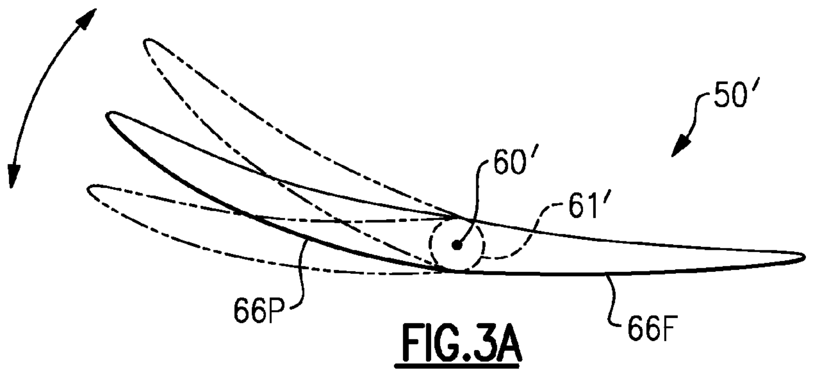
FIG. 3A is a sectional view of another embodiment of a single FEGV airfoil.
Figure 3B:
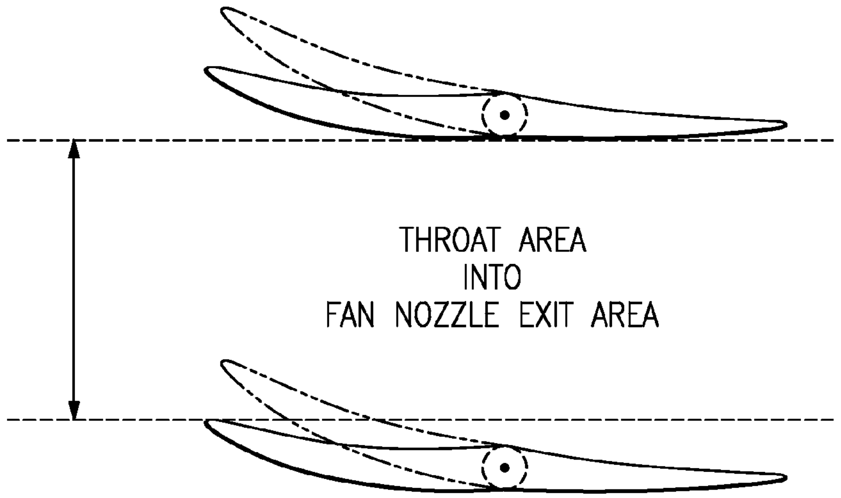
FIG. 3B is a sectional view of the FEGV illustrated in FIG. 3A shown in a first position.
Figure 3C:
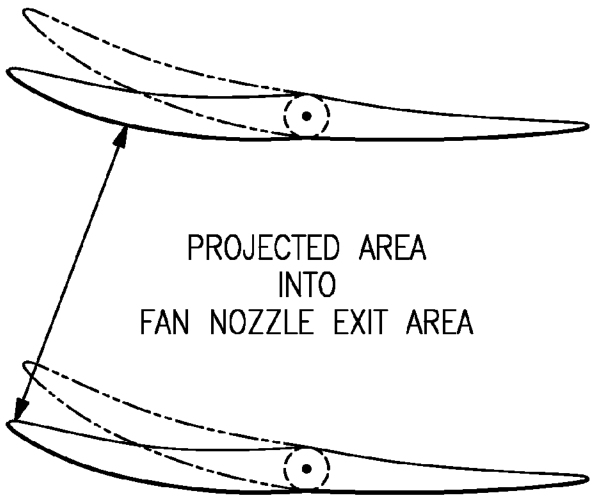
FIG. 3C is a sectional view of the FEGV illustrated in FIG. 3A shown in a rotated position.

Referring to FIG. 3A, another embodiment of the FEGV system 36' includes a multiple of fan exit guide vane 50' which each includes a fixed airfoil portion 66F and pivoting airfoil portion 66P which pivots relative to the fixed airfoil portion 66F. The pivoting airfoil portion 66P may include a leading edge flap which is actuatable by an actuator system 62' as described above to vary both the throat area (FIG. 3B) and the projected area (FIG. 3C).

Figure 4A:
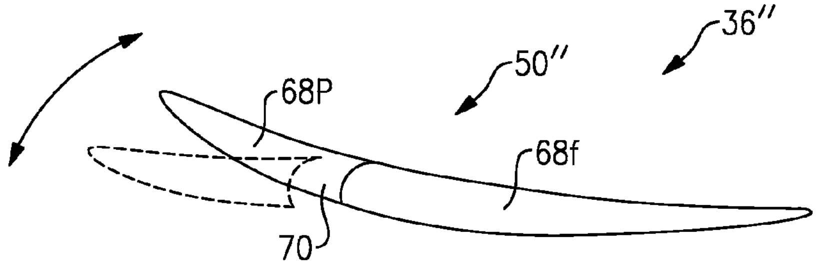
Figure 4B:
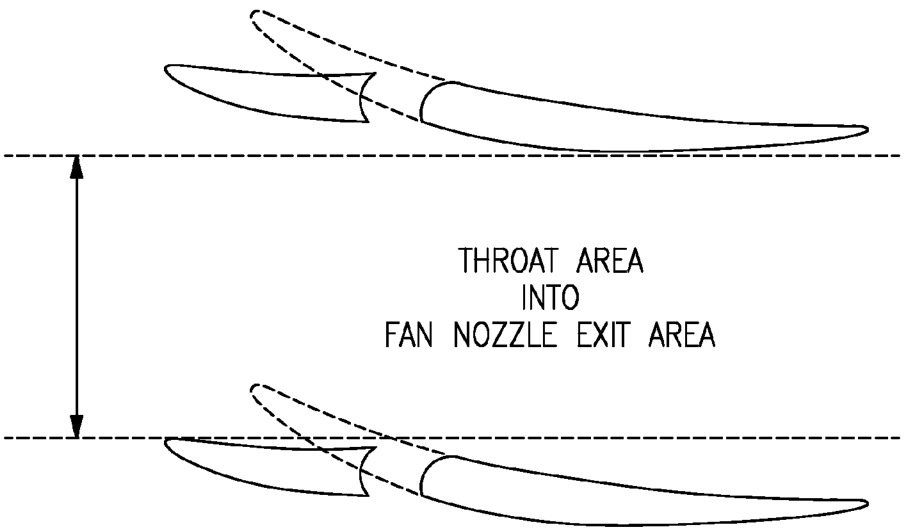
FIG. 4B is a sectional view of the FEGV illustrated in FIG. 4A shown in a first position.
Figure 4C:
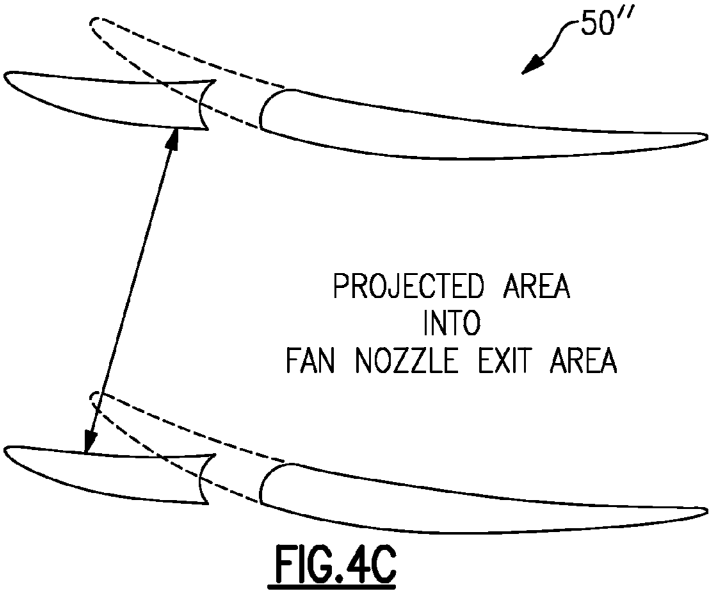
FIG. 4C is a sectional view of the FEGV illustrated in FIG. 4A shown in a rotated position.

Referring to FIG. 4A, another embodiment of the FEGV system 36" includes a multiple of slotted fan exit guide vane 50" which each includes a fixed airfoil portion 68F and pivoting and sliding airfoil portion 68P which pivots and slides relative to the fixed airfoil portion 68F to create a slot 70 vary both the throat area (FIG. 4B) and the projected area (FIG. 4C) as generally described above. This slatted vane method not only increases the flow area but also provides the additional benefit that when there is a negative incidence on the fan exit guide vane 50" allows air flow from the high-pressure, convex side of the fan exit guide vane 50" to the lower-pressure, concave side of the fan exit guide vane 50" which delays flow separation.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A gas turbine engine comprising:

a core nacelle defined about an engine centerline axis;

a fan nacelle mounted at least partially around said core nacelle to define a fan bypass airflow path for a fan bypass airflow having a bypass ratio greater than about six (6);

a fan variable area nozzle axially movable relative said fan nacelle to vary a fan nozzle exit area and adjust a pressure ratio of the fan bypass airflow during engine operation, the fan pressure ratio less than about 1.45;

a multiple of fan exit guide vanes in communication with said fan bypass flow path, said multiple of fan exit guide vanes axially forward of the fan variable area nozzle; and a controller in communication with said multiple of fan exit guide vanes, wherein the controller is operable to adjust the multiple of fan exit guide.

2. The engine as recited in claim 1, wherein said multiple of fan exit guide vanes are simultaneously rotatable.

3. The engine as recited in claim 1, wherein said multiple of fan exit guide vanes are mounted within an intermediate engine case structure.

4. The engine as recited in claim 1, wherein each of said multiple of fan exit guide vanes include a pivotable portion rotatable about said axis of rotation relative to a fixed portion.

5. The engine as recited in claim 4, wherein said pivotable portion includes a leading edge flap.

6. The engine as recited in claim 1, wherein the controller is operable to control a fan variable area nozzle to vary a fan nozzle exit area and adjust the pressure ratio of the fan bypass airflow.

7. The engine as recited in claim 6, wherein said controller is operable to reduce said fan nozzle exit area at a cruise flight condition.

8. The engine as recited in claim 6, wherein said controller is operable to control said fan nozzle exit area to reduce a fan instability.

9. The assembly as recited in claim 1, further comprising a gear system driven by a core engine within the core nacelle to drive a fan within said fan nacelle, said fan defines a corrected fan tip speed less than about 1150 ft/second.

10. The engine as recited in claim 1, further comprising a gear system driven by a core engine within the core nacelle to drive a fan within the fan nacelle, said gear system defines a gear reduction ratio of greater than or equal to about 2.3.

11. The engine as recited in claim 1, further comprising a gear system driven by a core engine within the core nacelle to drive a fan within the fan nacelle, said gear system defines a gear reduction ratio of greater than or equal to about 2.5.

12. The engine as recited in claim 1, further comprising a gear system driven by said core engine to drive said fan, said gear system defines a gear reduction ratio of greater than or equal to 2.5.

13. The engine as recited in claim 1, wherein said core engine includes a low pressure turbine which defines a low pressure turbine pressure ratio that is greater than about five (5).

14. The engine as recited in claim 1, wherein said core engine includes a low pressure turbine which defines a low pressure turbine pressure ratio that is greater than five (5).

15. The engine as recited in claim 1, wherein said fan bypass airflow defines a bypass ratio greater than about ten (10).

16. The engine as recited in claim 1, wherein said fan bypass airflow defines a bypass ratio greater than ten (10).

17. The engine as recited in claim 1, wherein each of the multiple of fan exit guide vanes includes an airfoil portion defined by an outer airfoil wall between a leading edge and a trailing edge.

18. The engine as recited in claim 17, wherein the outer airfoil wall has a generally concave shaped portion forming a pressure side and a generally convex shaped portion forming a suction side.

19. The engine as recited in claim 1, wherein each of the multiple of fan exit guide vane is mounted about a vane longitudinal axis of rotation, said vane longitudinal axis of rotation located about a geometric center of gravity.

20. The engine as recited in claim 1, wherein each of the multiple of fan exit guide vane is in communication with an actuator system.

21. The engine as recited in claim 1, wherein each of the multiple of fan exit guide vane is independently adjustable.

22. The engine as recited in claim 1, wherein the core nacelle houses a core engine comprising a low spool and a high spool, said low spool including a low pressure compressor and a low pressure turbine and said high spool including a high pressure compressor and a high pressure turbine.

* * * * *